United States Patent [19]

Kneip

[11] Patent Number: 5,050,906
[45] Date of Patent: Sep. 24, 1991

[54] SAFETY BELT SYSTEM, PARTICULARLY FOR MOTOR VEHICLES

[75] Inventor: Rainer Kneip, Ditzingen, Fed. Rep. of Germany

[73] Assignee: Dr. Ing. h.c.F. Porsche AG, Fed. Rep. of Germany

[21] Appl. No.: 553,580

[22] Filed: Jul. 18, 1990

[30] Foreign Application Priority Data

Jul. 21, 1989 [DE] Fed. Rep. of Germany ....... 3924149

[51] Int. Cl.$^5$ ............................................ B60R 22/02
[52] U.S. Cl. ..................................... 280/805; 280/801
[58] Field of Search ................................ 280/801, 805

[56] References Cited

U.S. PATENT DOCUMENTS

| | | | |
|---|---|---|---|
| 3,891,272 | 6/1975 | Takada | 280/805 |
| 4,588,208 | 5/1986 | Yoshitsugu | 280/805 |
| 4,854,608 | 8/1989 | Barral | 280/805 |
| 4,958,853 | 9/1990 | Doty | 280/801 |

FOREIGN PATENT DOCUMENTS 1903055 8/1970 Fed. Rep. of Germany ...... 280/805
2426203 11/1975 Fed. Rep. of Germany ...... 280/805

Primary Examiner—Kenneth R. Rice
Attorney, Agent, or Firm—Evenson, Wands, Edwards, Lenahan & McKeown

[57] ABSTRACT

A safety belt system comprises a belt strap at which locally an energy absorption member is provided which is formed by a belt strap section which is folded together at least once and is sewn together. So that the occupant of the seat or the repair shop, even after a minor accident, is informed as to whether the safety belt system must be exchanged, a marking is mounted at the belt strap adjacent to the energy absorption member in such a manner that, when the energy absorption system is intact, the marking is invisible to the occupant of the seat or the repair shop, whereas when the seam is at least partially ripped open, the marking is within view.

12 Claims, 2 Drawing Sheets

SAFETY BELT SYSTEM, PARTICULARLY FOR MOTOR VEHICLES

BACKGROUND AND SUMMARY OF THE INVENTION

The invention relates to a safety belt system, particularly for motor vehicles, having a belt strap at which locally an energy absorption member is provided by means of which a belt strap section is formed which is folded together at least once and is sewn together, the energy absorption member extending inside an envelope-type belt strap covering.

Energy absorption members of this type on belt straps have the purpose of reducing energy in a targeted manner in the case of an accident in order to prevent serious injury to the user of the safety belt or occupant of the seat. A safety belt system having an energy absorption member of this type is known from German Patent Document DE-AS 24 44 274. In the case of an accident taking place at a speed of approximately 50 km/h, the seam between the sewn-together belt strap sections which are placed together in the shape of a loop rips open completely, thereby effectively reducing energy. In the case of minor accidents at significantly lower speeds, however, the seam between the folded-together belt strap sections is not or is only partially ripped open. Since the energy absorption members are arranged inside the envelope-type belt strap covering in a hidden manner, the occupant of the seat or the repair shop cannot see whether the energy absorption member was damaged or was not damaged in a minor accident, or whether an exchange is required of the safety belt system containing the energy absorption member.

It is an object of the invention to take such measures at a safety belt system with an integrated energy absorption member that the occupant of the seat or the repair shop knows, as early as at the time of a minor accident, whether the belt strap must be exchanged.

According to the invention, this object is achieved by providing an arrangement wherein a marking is provided at the belt strap adjacent to the energy absorption member in such a manner that the marking is invisible to an external observer of the seat when the energy absorption member is intact and that the marking is visible to an external observer when the seam of the energy absorption member is at least partially ripped, whereby external observers, such as a vehicle occupant or vehicle repair shop personnel can detect the condition of the belt strap section without removing the belt strap covering.

The principal advantages achieved by means of the invention are that, by means of the arrangement of a marking, it is made clear to the belt user or the repair shop whether, after a minor accident, the safety belt with the integrated energy absorption member must be exchanged, whereby a perfect functioning of the safety belt system is always ensured. By means of the special position of the marking according to certain preferred embodiments, it is achieved that, even in the case of a relatively slight lengthening of the belt strap, it is indicated to the user of the belt or the repair shop that the belt must be replaced.

The marking can be made in a simple and inexpensive manner and may be formed as a color bar, a line of writing, a symbol or the like, according to various embodiments contemplated.

Other objects, advantages and novel features of the present invention will become apparent from the following detailed description of the invention when considered in conjunction with the accompanying drawings.

DETAILED DESCRIPTION OF THE DRAWINGS

Figure 1:
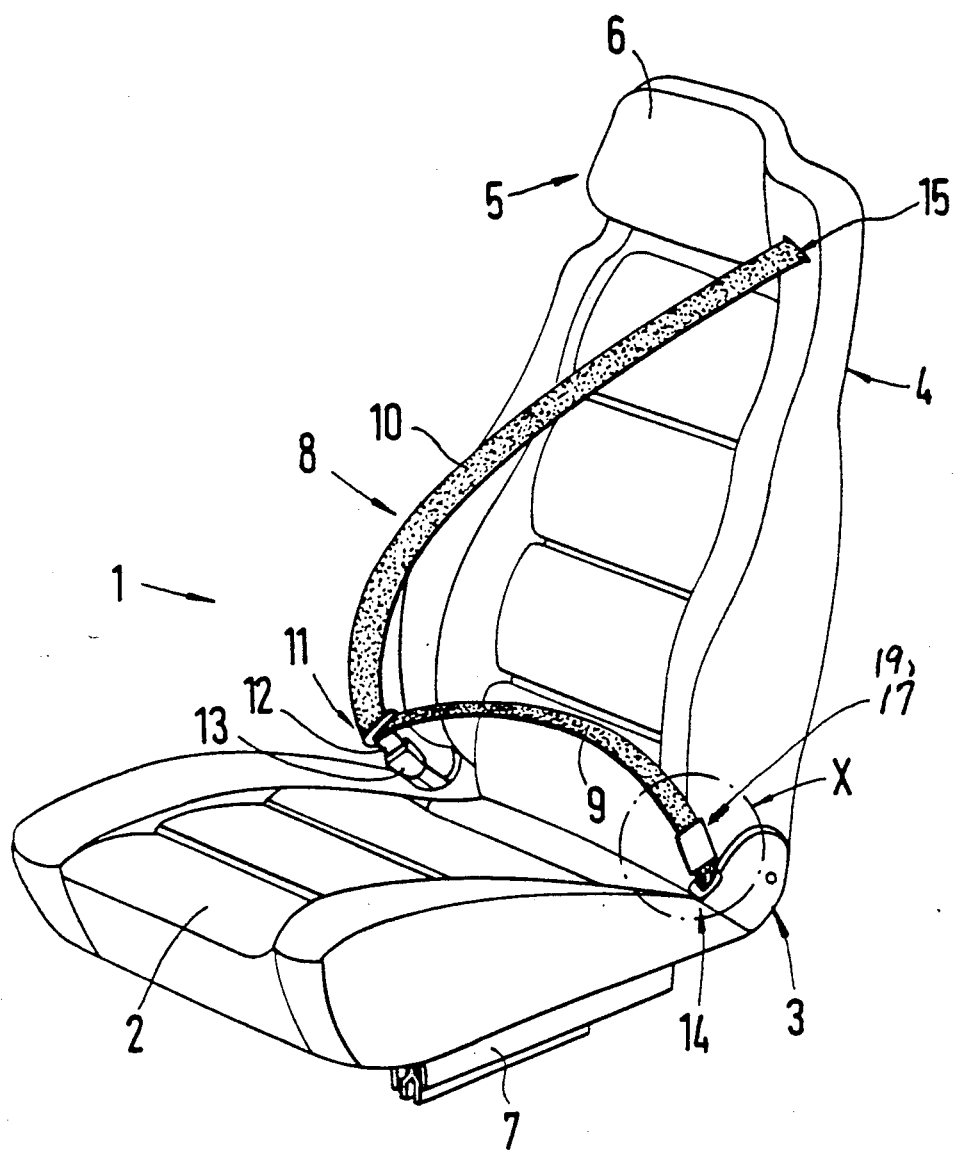
FIG. 1 is a schematic diagonal view from the front of a motor vehicle seat having a safety belt system, constructed according to a preferred embodiment of the invention.
Figure 2:
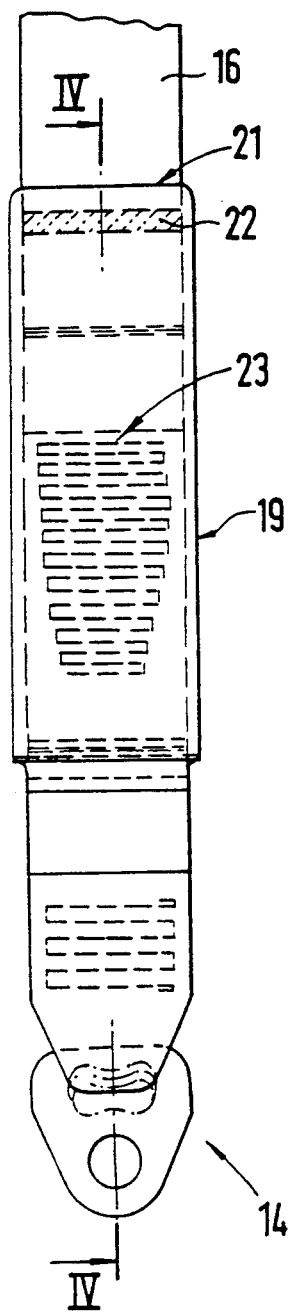
FIG. 2 is an enlarged view of a detail X of FIG. 1 when the energy absorption member is intact.

The seat 1 for a motor vehicle, an airplane or the like shown in FIG. 1 comprises a seat part 2 which is connected with an inclination-adjustable backrest 4 by means of adjusting mountings arranged on both sides. An upper section 5 of the backrest 4 is constructed as a stationary headrest 6. The seat part 2 is slidably disposed, by means of guide rails 7 extending in the longitudinal direction of the vehicle, at the adjacent vehicle floor which is not shown in detail.

For protecting a vehicle occupant seated in the seat 1, a safety belt system 8 is provided which, according to FIG. 1, is constructed as a three-point safety belt. The safety belt system 8 comprises a lap belt 9 and a diagonal shoulder belt 10 which have a common lower holding point 11. This holding point 11 is formed by a buckle insert clip 12 which is slidably held at the belt strap 16 and which can be locked into a buckle receiving part 13. The lap belt 9 extends from the holding point 11 to a second holding point 14 on the other side of the seat 1 which is arranged approximately at the same height. Holding point 14 is constructed as a belt loop.

The diagonal shoulder belt 10 extends from the lower holding point 11 approximately diagonally to the backrest 4 to an upper holding point 15 which is arranged in the area of the shoulder of the vehicle occupant, specifically laterally next to the headrest 6 at the backrest 4. The upper holding point 15 may be constructed as a deflection mounting or as a fastening mounting (belt retractor). In addition, the upper holding point 15, in a manner not shown in detail, can be adjusted in the vertical direction so that an optimal adjustment of the upper holding point 15 is made possible for seat occupants of different heights.

In addition, in a manner which is not shown, the vehicle is equipped with an air bag on the driver side and on the passenger side. So that an occupant of the seat, in the case of an accident, is not excessively stressed at the chest as a result of the air bag and of the diagonal shoulder strap 10, the safety belt system 8 locally has an energy absorption member 17. According to FIG. 1, the energy absorption member 17 is arranged above the holding point 14 and is formed by a belt strap section 18 which is folded together at least once and is sewn together. The energy absorption member 17 is also called a textile tear member which is provided with a seam 23 (tear seam). The seam 23 is designed in such a manner that a tearing-open of the seam 23 takes place only starting at a defined delay. If the seam 23 tears open completely, the belt strap 16 is lengthened by approximately 100 to 200 mm.

Figure 4:
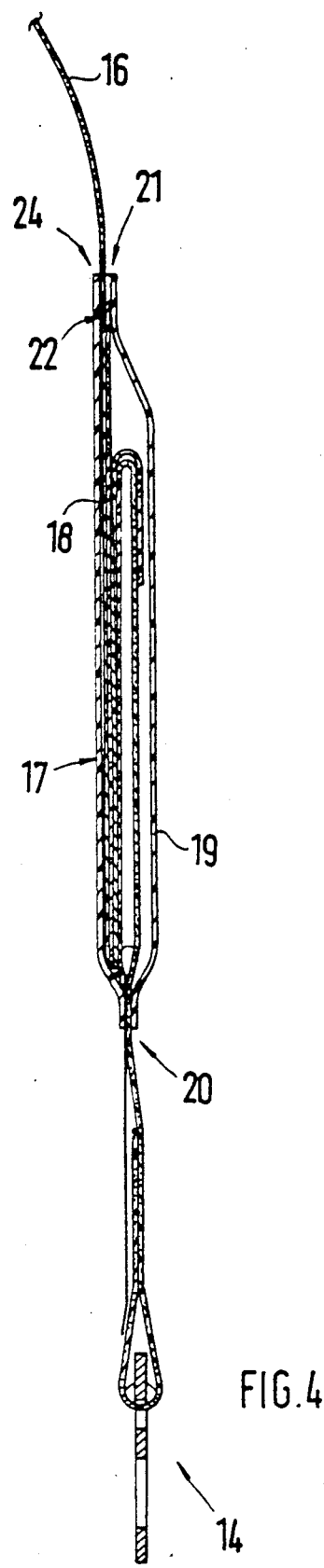
FIG. 4 is an enlarged sectional view taken along Line IV—IV of FIG. 2.

Corresponding to FIG. 4, the energy absorption member 17 is arranged in a hidden manner inside an envelope-type belt strap covering 19 which is produced of a suitable thin-walled plastic material. At both its end areas, the belt strap covering 19 has openings 20, 21 for the guiding-through of the belt strap 16. In the area of the folded-together energy absorption member 17, the belt strap covering 19 has a larger cross-section than at its two ends.

According to the invention, the belt strap 16 is provided with a marking 22 adjacent to the energy absorption member 17 in such a manner that the marking 22, when the energy absorption member 17 is intact, is invisible to the occupant of the seat (belt user), whereas, when the seam 23 of the energy absorption member 17 is at least partially ripped open, it is visible to the occupant of the seat. When the energy absorption member 17 is intact, the marking 22 is arranged in a hidden manner inside the envelope-type belt strap covering 19. According to FIG. 4, the marking is provided below the upper edge area 24 of the belt strap covering 19, specifically adjacent to the opening 21 for the belt strap 16.

Figure 3:
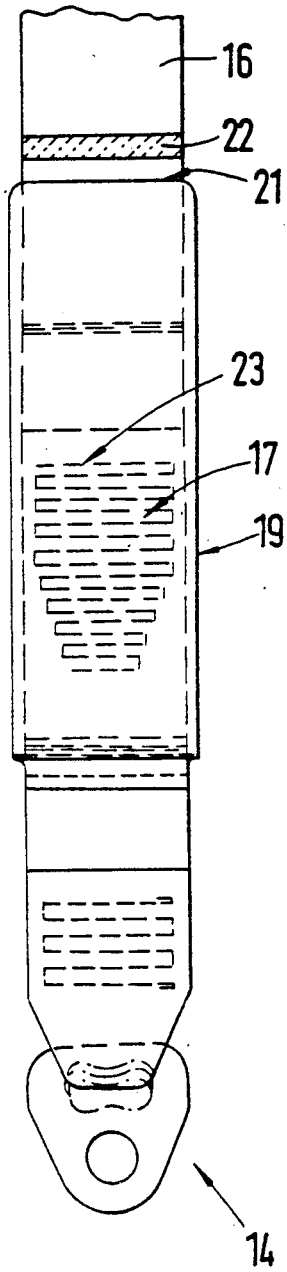
FIG. 3 is an enlarged view of a detail X of FIG. 1 when the seam of the energy absorption member is partially ripped open.

If, in a minor accident, the seam 23 tears open at least partially (FIG. 3), the belt strap 16 lengthens and the marking 22 arrives outside the belt strap covering 19 so that the occupant of the seat or the repair shop is immediately informed of the fact that the safety belt system 8 must be exchanged.

The marking 22 may be selected to be either a narrow color bar extending transversely to the belt strap 16, or as a line of writing, a symbol, or the like. If a color bar is selected, it will clearly differ from the color of the belt strap 16. Also the line of writing, "Change Seat Belt" or the like may, for example, be used. The marking may, for example, be printed on or sewn on. In the embodiment shown, all linking points 11, 14, 15 of the safety belt system 8 are arranged directly at the seat 1. However, the possibility also exists that the linking points 11, 14, 15 of the safety belt system 8 be provided on the side of the vehicle body at the transmission drive tunnel, at the side panel or at the seat rails.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. A safety belt system, particularly for motor vehicles, having a belt strap at which locally an energy absorption member is provided which is formed by a belt strap section which is folded together at least once and is sewn together, the energy absorption member extending inside a belt strap covering, wherein a marking is provided at the belt strap adjacent to the energy absorption member in such a manner that the marking is invisible to an external observer of the seat when the energy absorption member is intact and that the marking is visible to an external observer when the seam of the energy absorption member is at least partially ripped, whereby external observers, such as a vehicle occupant or vehicle repair shop personnel, can detect the condition of the belt strap section without removing the belt strap covering.

2. A safety belt system according to claim 1, wherein the marking for the belt strap is arranged inside the envelope-type belt strap covering when the energy absorption member is intact.

3. A safety belt system according to claim 1, wherein the marking extends adjacent to the upper opening of the belt strap covering when the energy absorption member is intact.

4. A safety belt system according to claim 1, wherein the marking arrives outside the belt strap covering and thus is visible to the vehicle occupant or to the repair shop even as a result of the partial ripping-open of the seam and thus by means of a slight lengthening of the belt strap, when the safety belt is worn.

5. A safety belt system according to claim 1, wherein the marking is formed by a color bar which is applied to the belt strap.

6. A safety belt system according to claim 1, wherein the marking is developed as a line of writing, a symbol or the like.

7. A method of making a safety belt system, particularly for motor vehicles, having a belt strap at which locally an energy absorption member is provided which is formed by a belt strap section which is folded together at least once and is sewn together, the energy absorption member extending inside a belt strap covering, wherein a marking is provided at the belt strap adjacent to the energy absorption member in such a manner that the marking is invisible to an external observer of the seat when the energy absorption member is intact and that the marking is visible to an external observer when the seam of the energy absorption member is at least partially ripped, whereby external observers, such as a vehicle occupant or vehicle repair shop personnel, can detect the condition of the belt strap section without removing the belt strap covering.

8. A method according to claim 7, wherein the marking for the belt strap is arranged inside the envelope-type belt strap covering when the energy absorption member is intact.

9. A method according to claim 7, wherein the marking extends adjacent to the upper opening of the belt strap covering when the energy absorption member is intact.

10. A method according to claim 7, wherein the marking arrives outside the belt strap covering and thus is visible to the vehicle occupant or to the repair shop even as a result of the partial ripping-open of the seam and thus by means of a slight lengthening of the belt strap, when the safety belt is worn.

11. A method according to claim 7, wherein the marking is formed by a color bar which is applied to the belt strap.

12. A method according to claim 7, wherein the marking is developed as a line of writing, a symbol or the like.

* * * * *